United States Patent [19]

Williams

[11] Patent Number: 4,719,701
[45] Date of Patent: Jan. 19, 1988

[54] DUAL BLADE SAW ATTACHMENT

[76] Inventor: David S. Williams, Rte. 1, Box 227, Oak Hill, W. Va. 25901

[21] Appl. No.: 918,023

[22] Filed: Oct. 14, 1986

[51] Int. Cl.$^4$ .............................................. B26B 3/00
[52] U.S. Cl. ........................................ 30/304; 30/172;
30/355; 83/875; 156/250
[58] Field of Search ................ 30/355, 172, 304, 299;
83/875, 477, 508.2, 508.3; 156/250

[56] References Cited

U.S. PATENT DOCUMENTS 4,618,395 10/1986 Breucha ................................ 30/304

Primary Examiner—Paul A. Bell
Assistant Examiner—Willmon Fridie, Jr.
Attorney, Agent, or Firm—Don Ferrell

[57] ABSTRACT

An attachment for a portable jig saw permits a concurrent use of a pair of jig saw blades. The blades are each attached to a holder by threaded fasteners, while the holder is then threadably attached to the jig saw. The spacing between the blades may be varied by an adjustment of the holder.

6 Claims, 3 Drawing Figures

DUAL BLADE SAW ATTACHMENT

BACKGROUND OF THE INVENTION

1. Field of the Invention

The present invention relates to cutting devices, and more particularly pertains to a new and improved holder for saw blades which permits the concurrent use of a pair of blades in a jig saw.

2. Description of the Prior Art

Various arrangements for permitting the concurrent use of a pair of cutting blades are known in the prior art. For example, U.S. Pat. No. 782,121, which issued to R. Forman on Feb. 7, 1905, discloses an early saw construction that utilizes a holder assembly for a plurality of saw blades. More particularly, the invention disclosed in this patent is directed to a manually usable saw having two paralleledly aligned blades. The distance between the blades can be varied and more than two blades can be used if desired.

While the above-described saw illustrates the basic concept of a dual saw blade construction, the particular design of the holder assembly would not facilitate a use of the invention with a modern day electrically powered saw. The recognition of such a need for a dual blade saw utilizable with an electric power source led to the issuance of U.S. Pat. No. 3,470,923, which issued to G. Besthorne on Oct. 7, 1969. This patent discloses a dual blade notching saw which effectively comprises a pair of jig saw blades integrally attached together. A support pin is positioned between the blades to provide for the reinforcement thereof. While this blade construction is operable to perform its desired function, no deep cutting of wood could be facilitated without a removal of the reinforcement pin. Further, the blades are located at a fixed distance apart with no means being provided for an adjustment of the spacing therebetween.

Accordingly, it can be appreciated that there exists a continuing need for new and improved blade constructions which provide for an efficient and easy variance of spacing therebetween. In this respect, the present invention substantially fulfills this need.

SUMMARY OF THE INVENTION

In view of the foregoing disadvantages inherent in the known types of dual saw blade constructions now present in the prior art, the present invention provides an improved dual saw blade construction which permits the concurrent use of a pair of saw blades while providing for space adjustment therebetween. As such, the general purpose of the present invention, which will be described subsequently in greater detail, is to provide a new and improved dual saw blade construction which has all the advantages of the prior art dual saw blade constructions and none of the disadvantages.

To attain this, the present invention comprises a saw blade holder which is directly attachable to a powered jig saw or the like. The holder provides for the holding of at least two paralleledly aligned saw blades, with such blades being retained in fixed securement to the holder by means of threaded fasteners. The holder effectively comprises two separable parts each of which has a serrated surface. Each of the separable pieces of the holder hold one of the saw blades, and the serrated surfaces may be adjustably positioned together to thus retain the saw blades at a desired spaced apart position. A further threaded fastener may then be tightened against the saw power shaft to thus hold the separable sections of the holder in fixed engagement while also holding the same fixedly secured to the shaft.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved dual saw blade holder which has all the advantages of the prior art dual saw blade holders and none of the disadvantages.

It is another object of the present invention to provide a new and improved dual saw blade holder which may be easily and efficiently manufactured and marketed.

It is a further object of the present invention to provide a new and improved dual saw blade holder which is of a durable and reliable construction.

An even further object of the present invention is to provide a new and improved dual saw blade holder which is susceptible of a low cost of manufacture with regard to both materials and labor, and which accordingly is then susceptible of low prices of sale to the consuming public, thereby making such dual saw blade holders economically available to the buying public.

Still yet another object of the present invention is to provide a new and improved dual saw blade holder which provides in the apparatuses and method of the prior art some of the advantages thereof, while simultaneously overcoming some of the disadvantages normally associated therewith.

Still another object of the present invention is to provide a new and improved dual saw blade holder which facilitates the concurrent use of a pair of saw blades with an electrically powered saw.

Yet another object of the present invention is to provide new and improved dual saw blade holder which provides for adjustable spacing between paralleledly aligned saw blades.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
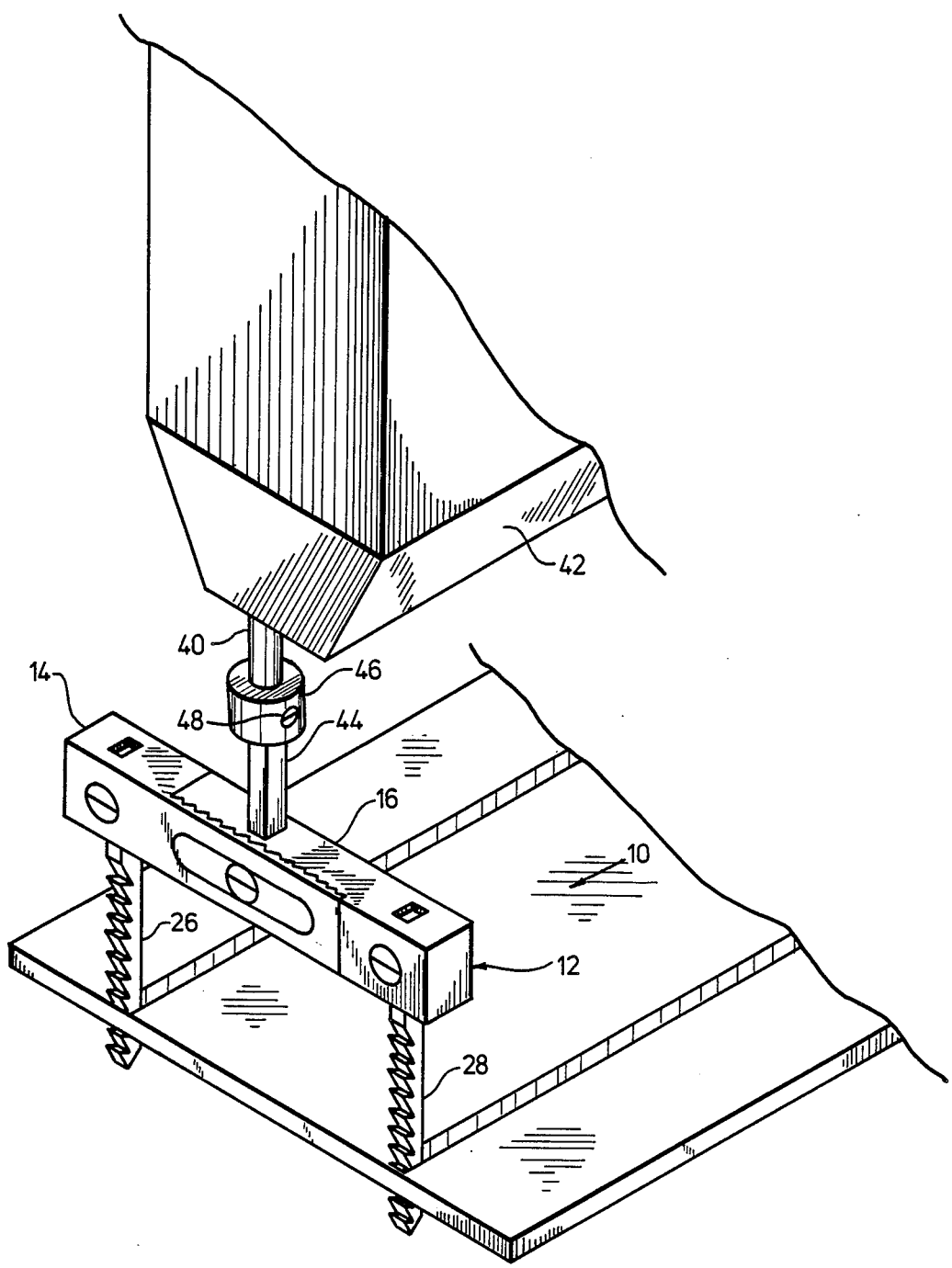
FIG. 1 is a perspective view of the dual saw blade attachment comprising the present invention.
Figure 2:
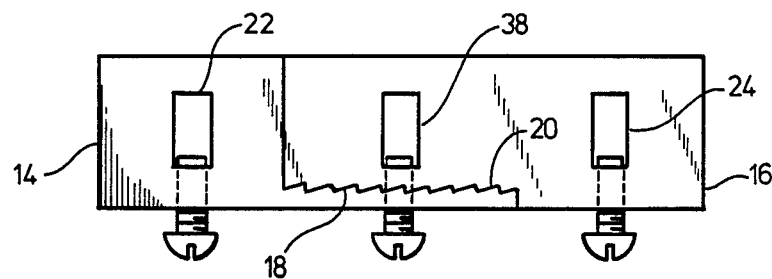
FIG. 2 is a top plan view of the invention.
Figure 3:
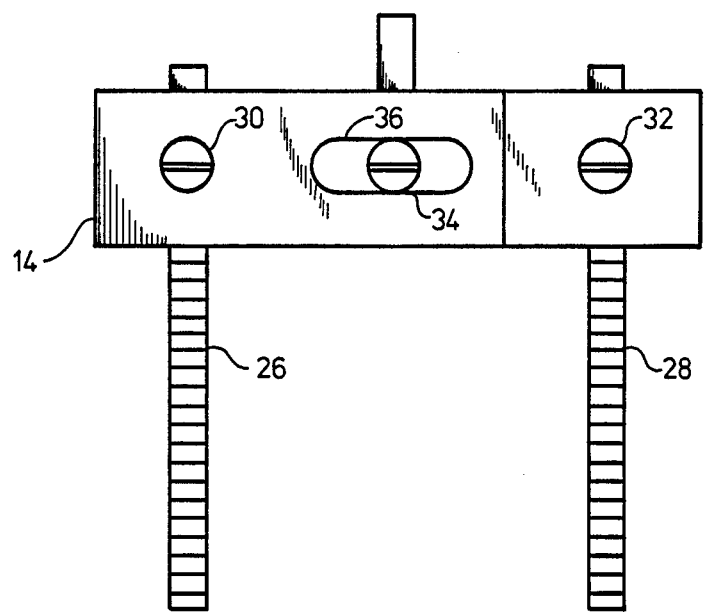
FIG. 3 is a front elevation view of the invention.

With reference now to the drawings, and in particular to FIGS. 1, 2 and 3 thereof, a new and improved dual saw blade attachment embodying the principles and concepts of the present invention and generally designated by the reference numeral 10 will be described.

More specifically, it will be noted that the dual saw blade attachment 10 effectively comprises a blade holder 12 which in turn consists of a pair of separable sections 14, 16. Each of the sections 14, 16 are basically of an L-shaped design an include respective serrated surfaces 18, 20. The serrated surfaces 18, 20 are engagable, as best illustrated in FIG. 2, so as to provide a partial fixed securement of the sections 14, 16 together.

The blade holder 12 further includes a pair of through-extending apertures 22, 24, with the aperture 22 extending through the section 14 and the aperture 24 extending through the section 16. A first jig saw blade 26 is positionable in the aperture 22 and a second jig saw blade 28 is positionable in the aperture 24. Threaded fasteners 30, 32 are engageable with the blades 26, 28 within the respective apertures 22, 24. The fasteners 30, 32 may be tightened to retain the blades 26, 28 in locked engagement with the blade holding sections 14, 16.

A further threaded fastener 34 is positionable within a slot 36 formed in the blade holding section 14. The fastener 34 extends into a further through-extending aperture 38 which is designed to receive the reciprocating power shaft 40 forming a part of a conventional jig saw 42. The fastener 34 extends into the aperture 38 and may be tightened against the drive shaft 40 to effect a retention of the blade holder 12 with the saw 42. The tightening of the fastener 34 also effects a fixed engagement between the blade holding sections 14, 16 whereby no further spaced apart movement of the blades 26, 28 can be achieved.

If desired, a special shank adapter 44 can be interconnected between the blade holding block 12 and the power drive shaft 40. The shank adapter 44 could include a socket 46 that would permit the adjustable positioning of a saw drive shaft 40 therein with a set screw 48 then being utilized to effect an attachment of the drive shaft to the shank adapter. The shank adapter 44 would be utilized to facilitate an efficient and easy attachment of various size drive shafts 40 to the blade holder 12 without any substantial modifications being required.

With respect to the manner of usage and operation of the present invention, it can be appreciated that a user thereof need only to position a pair of saw blades 26, 28, or the like, within the respective slots 22, 24. The tightening of the screws 30, 32 will then effect a fixed securement of the blades 26, 28 within the respective slots 22, 24. The spacing between the blades 26, 28 can be adjusted by permitting the serrated surfaces 18, 20 to slide over one another until a desired spacing is achieved. A threaded tightening of the screw 34 will then effect a securement of the surfaces 18, 20 together, thereby to lock the pieces 14, 16 together, while a further tightening of the screw 34 against the shank adapter 44 or drive shaft 40 will complete the attachment of the invention to a jig saw 42. Of course, the slot 36 extends through to both of the separable pieces 14, 16 so as to facilitate the adjustable positioning of the pieces together. The saw 42 may then be utilized to cut perfect patterns, such as scrolls, circles, "S" shapes, and the like, while the offset positioning of each of the blades 26, 28 permits the use of the blades in corners and similar difficult locations without interference from the saw 42 per se.

With respect to the above description then, it is to realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A dual blade saw attachment for facilitating a concurrent use of a pair of spaced apart, paralleledly aligned saw blades, said attachment comprising:
   a. a blade holder means for holding first and second saw blades in parallel alignment, said blade holder means comprising first and second members fixedly securable together;
   b. an adjustment means for facilitating a spaced apart adjustment of said first and second saw blades, said adjustment means including a first serrated surface on said first member and a second serrated surface on said second member, said first and second serrated surfaces being engageable at various positions to effect said spaced apart adjustment of said first and second saw blades;
   c. a first securing means for securing said blade holder means to a power saw, said first securing means being operable to effect a fixed securement of said first and second members together; and,
   d. a second securing means for securing said first and second saw blades to said blade holder means.

2. The dual blade saw attachment of claim 1, wherein said first securing means includes a threaded fastener.

3. The dual blade saw attachment of claim 2, wherein said threaded fastener is retained within a slot to facilitate an adjustable movement thereof in response to a spaced apart positioning of said first and second saw blades.

4. The dual blade saw attachment of claim 3, wherein said second securing means includes threaded fasteners engageable with first and second through-extending apertures.

5. The dual blade saw attachment of claim 4, wherein said first saw blade is positionable within said first through-extending aperture and said second saw blade is positionable within said second through-extending aperture.

6. The dual blade saw attachment of claim 5, wherein said first through-extending aperture is positioned within said first member and said second throught-extending aperture is positioned within said second member.

* * * * *